Patented Oct. 24, 1939

2,177,413

UNITED STATES PATENT OFFICE 2,177,413

TILING

Herbert A. Winkelmann, Chicago, Ill., assignor to Marbon Corporation, Chicago, Ill., a corporation of Delaware No Drawing. Application March 6, 1937, Serial No. 129,385

8 Claims. (Cl. 106—7)

This invention relates to compositions particularly adapted for tiles.

It is an object of this invention to provide a floor tile which is extremely tough, and durable, as well as being highly resistant to alkalis, fats, oils, greases, alcohols and water.

Another object is to provide a tile composition which may be made in attractive colors and patterns, including light colored designs and marbleized or striated effects.

A further object is to provide a tile which can be readily heat sealed to adjoining tiles by means of heat and pressure.

Other objects will become apparent from the specification and adjoining claims.

In the manufacture of a tile in accordance with this invention I employ finely divided materials or fillers combined with a binder including as an essential ingredient of the binder a rubber hydrohalide, and also preferably in conjunction with the rubber hydrohalide a heat plasticizer which is generally a resin or wax which is or becomes fluid under the conditions of milling used to mix together my ingredients. Preferably, also, a soap is used as lubricant; and a small amount of an oil as a softener. I have also found that for proper milling without decomposition of the rubber hydrochloride, and also to retard deterioration of the tile during usage, the rubber hydrohalide should be stabilized. This may be accomplished by the addition of various materials described in my Patent 2,046,986 and in my co-pending application S. N. 79,174, filed May 11, 1936 (now Patent 2,075,251), of which this application is in part a continuation. Among the most suitable stabilizers are magnesium oxide, magnesium carbonate, calcium oxide, calcium stearate, barium oxide, litharge, hexamethylene tetramine, and other basic materials especially those from the group of alkali metal compounds and alkali earth metal compounds although indeed all basic materials except zinc compounds and a few aromatic amines are heat stabilizers to some extent and even some non-basic materials such as elemental sulfur and lead.

The rubber hydrohalide which I prefer is a rubber hydrochloride. Preferably a substantially saturated product is used, having a chlorine content of 28% to 34% since this product is harder, higher flowing and more oil resistant than the products of lesser saturation, and less brittle than chlorinated rubber hydrochlorides or saturated chlorinated rubbers. The crystalline rubber hydrochlorides are also preferred to the amorphous rubber hydrochloride since the amorphous rubber hydrochloride is of lesser oil resistance and has such a low flow point that it is readily subject to cold flow. Between the various crystalline rubber hydrochlorides there is also some difference and in general the crystalline substantially saturated rubber hydrochlorides obtainable by reacting undissolved rubber with hydrogen chloride at between −35 degrees C. to plus 85 degrees C. are the types of rubber hydrochlorides which in general I prefer to use as a binder for my improved light colored tiles.

The use of a heat plasticizer with rubber hydrohalides is an important part of my invention. Broadly speaking, a heat plasticizer may be any material which is or becomes fluid under the temperature condition of milling, a temperature which will range from slightly above room temperature to 280 degrees F. and above. I prefer, however, to use a hard heat plasticizer, that is, a heat plasticizer which is a solid at normal room temperature but which quickly becomes fluid at above room temperature and below the decomposition temperature of stabilized rubber hydrochloride. Moreover, the best hard heat plasticizers are those which are highly compatible with rubber hydrochloride, which have relatively sharp softening points as compared to rubber hydrochloride, which are easier heat flowed or "worked" at temperatures of 150 degrees F. and above, than rubber hydrochlorides. Among the best hard heat plasticizers are glyceryl abietate, rosin, shellac, hexachlorethane, opal wax, gilsonite, cumarone resin, and chlorinated diphenyl. Vinyl resins, styrol resin, cellulose ethers, and cellulose esters can also be obtained having the proper flow characteristics. In general, however, the vinyl and styrol resins, although good heat plasticizers, are not strictly compatible, have a greater tendency towards cold flow than is ordinarily desirable, and, therefore, care must be taken not to use too much of these materials, or otherwise the tile will be too soft. Paraffin wax is likewise a heat plasticizer, although too soft, and too incompatible for use in more than small amounts. In addition, paraffin wax has a water repellent effect and a lubricating action and a slipping effect, which is useful. Soaps also act as lubricants. From the point of view of compatibility and all around effect, the soaps are the most suitable lubricants, particularly the water insoluble soaps. Calcium stearate, magnesium stearate, magnesium resinate, aluminum stearate, calcium oleate, lead stearate, lead oleate, give good lubricating results and in addition are heat stabilizers. Sodium stearate, although a good lubricant and heat stabilizer has the disadvantage of water solubility. Zinc stearate has the disadvantage of promoting decomposition and cyclization. For softening effect with or without lubricating effect, I may also use plasticizers which are liquid at normal room temperature, such as the liquid cumarone resins, the ethyl and methyl abietates, butyl stearate, dibutyl phthalate, and mineral oils. These are often used in conjunction with the hard heat plasticizers.

The employment of hard, heat plasticizers is of particular advantage in the manufacture of tile having a major proportion of filler compared to rubber hydrochloride, especially when a crystalline saturated high flow rubber hydrochloride is used. Rubber hydrochloride has high wetting power and will bind together a large volume of filler. However, the high flow point of saturated crystalline rubber hydrochloride makes it difficult to obtain an intimate mixture of rubber hydrochloride and very high proportions of filler by drying mixing methods such as milling. Moreover, it is generally desirable to make finished tiles by a calendering operation without recourse to a final molding step. The use of resins with rubber hydrochloride during the milling and calendering of compositions containing high proportions of non-thermoplastic filler aids greatly in the obtaining of homogeneous mixtures. Since a hard type tile is desired the resin should be a hard type heat plasticizer. It is then that the toughening effect of the rubber hydrochloride combined with the hardness of the heat plasticizer unite to give a floor tile of superior quality.

The employment of a lubricant is also an important part of my invention. Many materials have a lubricating or slipping action, including some materials which are plasticizers. However, my preferred lubricants are the soaps. These materials, being the reaction products of a relatively strong base and a weak acid, (a fatty acid), are in general good heat stabilizers. Unlike resinous materials they are not tacky during or after milling, but on the contrary tend to counteract the tackiness of the resins. The great value of the soaps is that they prevent sticking of the compositions to the mill and calender rolls. In general the soaps are used in minor amount compared to the rubber hydrochloride and a minor amount compared to the resins. I have found that it is highly advantageous to use a soap in my composition even though a lubricant such as a mineral oil is present, and that although a wax such as paraffin wax may be substituted for a soap, the soap is much more compatible with rubber hydrochloride than paraffin wax and has other advantages.

In carrying out the process of my invention, the rubber hydrochloride is added to the rolls of a mill such as is in common use in the rubber industry. A Banbury mill or similar mixer may also be used. The stabilizer such as viz. powdered magnesium oxide, is added and mixed into the rubber hydrohalide by milling. Under the heat and pressure of the rolls the rubber hydrochloride flows or fluxes, but because of the stabilizer does not decompose to any appreciable extent. To the fluxed stabilized rubber hydrochloride is then added a premix of the resins, soaps, oils, and the fillers such as for example: wood flour, cork dust, asbestos, etc. The temperature of the rolls is kept at about 120 to 220 degrees F., and that of the composition should not exceed approximately 300 degrees F. When the ingredients are thoroughly admixed, the composition is sheeted out on a series of calender rolls, and cut up into tiles of the required sizes and shapes. In general, methods of manufacture such as are used in the making of asphalt tile may be used, although temperatures should be lower, and certain other changes in details of operation may be made in accordance with the differences in characteristics of the compositions.

Examples of hard floor tiling composition are given below:

| | No. 2109, wgt. % | No. 2110, wgt. % | No. 2123, wgt. % |
|---|---|---|---|
| Rubber hydrochloride (crystalline type 33% chlorine) | 13.1 | 12.7 | 14.3 |
| Orange shellac | 1.5 | 1.4 | |
| Whiting | 36.0 | 34.8 | 32.6 |
| Paraffin wax | 1.1 | 1.1 | 1.0 |
| Mineral oil (Puropale #5) | 1.7 | 1.6 | 1.5 |
| Magnesium oxide | .5 | .4 | .6 |
| Cumarone resin (hard) (Cumar V½) | 7.9 | 10.9 | 7.1 |
| Cumarone resin (soft) (Cumar P-50) | 4.5 | 4.4 | |
| Fine asbestos | 33.7 | 32.7 | 40.3 |
| Red oxide of iron | | | 2.0 |

The above compositions give a light colored, hard floor tile, of high resistance to oils, of good durability and strength.

Examples of other hard floor tile compositions are given below:

| | 2088 wt. % | 2091 wt. % | 2097 wt. % | 2098 wt. % | 2099 wt. % | 2100 wt. % | 2101 wt. % | 2102 wt. % |
|---|---|---|---|---|---|---|---|---|
| Rubber hydrochloride (crystalline saturated) | 15.3 | 15.3 | 13.8 | 11.45 | 13.8 | 11.45 | 13.8 | 11.45 |
| Wood flour | 35.3 | | | | | | | |
| Whiting | 37.7 | 37.7 | 37.7 | 37.7 | 37.7 | 37.7 | 37.7 | 37.7 |
| Paraffin wax | 1.2 | 1.2 | 1.2 | 1.2 | 1.2 | 1.2 | 1.2 | 1.2 |
| Mineral oil (Puropale #5) | 1.7 | 1.7 | 1.7 | 1.7 | 1.7 | 1.7 | 1.7 | 1.7 |
| Glyceryl abietate Ester gum #7 | 8.3 | | | | | | | |
| MgO | .5 | .5 | .5 | .5 | .5 | .5 | .5 | .5 |
| Cumarone resin (soft) (Cumar P-50) | | 8.3 | | | | | | |
| Fine asbestos | | 35.3 | 35.3 | 35.3 | 35.3 | 35.3 | 35.3 | 35.3 |
| Vinyl chlor acetate (vinylite) | | | 1.53 | 3.82 | | | | |
| Cumarone resin (hard) (Cumar V½) | | | 8.3 | 8.3 | 8.3 | 8.3 | 8.3 | 8.3 |
| Cellulose acetate tenite | | | | | 1.53 | 3.82 | | |
| Orange shellac | | | | | | | 1.53 | 3.82 |

Another tile composition of high strength and durability, but of dark color, is given below:

| | 2048, wgt. % | 2049, wgt. % | 2050, wgt. % |
|---|---|---|---|
| Rubber hydrochloride (Marbon R) | 15.4 | 14.6 | 14.0 |
| Wood flour | 35.5 | 33.8 | 32.2 |
| Whiting | 37.9 | 35.9 | 34.4 |
| Paraffin wax | 1.2 | 1.1 | 1.1 |
| Gilsonite | 10.0 | 14.6 | 18.3 |

Two improved floor tile compositions of good hardness and toughness are given below:

| | Wgt. % | Wgt. % |
|---|---|---|
| Rubber hydrochloride (Marbon R) | 14.2 | 14.2 |
| Asbestos | 40.5 | 40.5 |
| Silica (200 mesh) | 20.44 | |
| Clay | | 20.44 |
| Banding sand | 12.1 | 12.1 |
| Magnesium oxide | .61 | .61 |
| Cumarone resin (hard) (Cumar FX) | 8.1 | 8.1 |
| Mineral oil (Puropale #5) | 1.01 | 1.01 |
| Color pigments | 1.01 | 1.01 |
| Calcium stearate | 2.03 | 2.03 |

Formulae for tile which are particularly suited for wall tiles and panels are given below:

|  | No. 2140, wgt. % | No. 2162, wgt. % | No. 2163, wgt. % |
| --- | --- | --- | --- |
| Rubber hydrochloride (Marbon R) | 40.0 | 50.0 | 39.1 |
| Magnesium oxide | 4.4 | 5.5 | 4.3 |
| Rayox (titanium oxide) | 2.2 | 2.8 | 2.2 |
| Dibutylphthalate | 6.7 | 5.5 | 4.3 |
| Opal wax |  | 5.5 | 4.3 |
| Whiting | 44.5 | 27.9 |  |
| Fine asbestos |  |  | 21.8 |
| Banding sand |  |  | 21.8 |
| Color pigment | 2.2 | 2.8 | 2.2 |

In addition to hard, relatively non-flexible tiles, I may make a flexible or rollable tile. This type of tile may be made in general by two methods:

(1) By over-milling or over-heating of compositions such as those used for making hard, non-flexible tile.

(2) Addition of more plasticizers such as mineral oils, soft cumarone resins, ethyl abietate and the like to the compositions.

The production of flexible tiles by an over-heating treatment is described in my copending application S. N. 99,879. Instead of milling at a temperature of about 280 degrees F., the temperature of the mass during milling is allowed to rise to about 290 degrees F. and maintained at this temperature for viz. twenty minutes or longer, in contact with an excess of basic stabilizer. The longer the milling and the higher the temperature, the greater the flexibility of the final product.

The proportion of ingredients in all my tiles may be varied to considerable extent with, however, variation in the properties of the tile. The proportions of rubber hydrohalide may be greatly increased, and as a matter of fact a good floor tile can be made with straight stabilized rubber hydrochloride. However, principally for economic reasons, fillers should be present with the stabilized rubber hydrochloride, and when it is desired to increase the amount of fillers such as wood flour, asbestos, etc., to a high amount, it is highly advantageous to use a homogenizing agent such as heat plasticizers, and for hardness of the tile a hard heat plasticizer is again of advantage. These hard heat plasticizers may be used in a wide range of proportions, the amount being limited by the fact that with too high proportions the tiles may be too brittle for ordinary usage. The toughening effect of rubber hydrohalides on these hard resinous heat plasticizers, however, makes it possible to use higher proportions of these hard resinous materials than would ordinarily be the case.

My tiles, therefore, which contain hard heat plasticizers and rubber hydrohalides have the advantage of toughness combined with hardness in an inexpensive composition. My tiles which contain rubber hydrochloride, filler, and water insoluble soaps are of improved water resistance, and have improved texture and strength. In general, my tiles are highly resistant to alkalis, fats, oils, greases, alcohol, and water. They have, also, the valuable property of being so readily heat sealable that adjoining tiles on a floor may be sealed together by means of a hot iron and slight pressure.

I claim:

1. A tile of substantial thickness comprising a filler and a binder including a rubber hydrochloride and a soap.

2. A tile of homogeneous composition and of substantial thickness comprising a filler and a binder including a stabilized rubber hydrohalide, a hard resinous substance, which compared to the rubber hydrohalide has a greater tendency to hot flow, a substance from the group consisting of waxes and soaps, and a non-thermoplastic filler, said filler being present in substantially larger quantity than said rubber hydrohalide.

3. A tile of substantial thickness comprising a filler and a binder including a rubber hydrochloride, a resin, and a water insoluble soap.

4. A tile of homogeneous composition and substantial thickness comprising a rubber hydrochloride, calcium stearate, and a large proportion of non-thermoplastic filler.

5. A composition adaptable for the production of tiling comprising a filler and a binder including a rubber hydrochloride, a hard resinous substance which, compared to the rubber hydrochloride, has a greater tendency to hot-flow; a soap, and a non-thermoplastic filler, said filler being present in substantially larger quantity than said rubber hydrochloride.

6. A composition adapted for the production of tiling comprising a filler and a binder including a rubber hydrochloride, a hard resinous substance which, compared to the rubber hydrochloride, has a greater tendency to hot flow, a wax, a basic substance and a non-thermoplastic filler, said filler being present in substantially larger quantity than said rubber hydrochloride.

7. A shaped article of manufacture of substantial thickness comprising a filler and a binder, including a rubber hydrochloride and a water insoluble soap.

8. A shaped article of manufacture of substantial thickness comprising a filler and a binder, including a rubber hydrochloride and a wax.

HERBERT A. WINKELMANN.